(12) United States Patent
Rola et al.

(10) Patent No.: US 9,914,192 B2
(45) Date of Patent: Mar. 13, 2018

(54) TOOLING SYSTEM WITH VISUAL IDENTIFICATION OF ATTACHED COMPONENT

(71) Applicant: Apex Brands, Inc., Apex, NC (US)

(72) Inventors: Martin Douglas Rola, Lexington, SC (US); Adrian Hilary Hetzel, Clarkston, MI (US)

(73) Assignee: Apex Brands, Inc., Apex, NC (US)

( * ) Notice: Subject to any disclaimer, the term of this patent is extended or adjusted under 35 U.S.C. 154(b) by 0 days.

(21) Appl. No.: 15/657,932

(22) Filed: Jul. 24, 2017

(65) Prior Publication Data

US 2017/0320183 A1    Nov. 9, 2017

Related U.S. Application Data

(62) Division of application No. 14/074,492, filed on Nov. 7, 2013, now Pat. No. 9,724,795.

(51) Int. Cl.
| | |
|---|---|
| *B23Q 15/20* | (2006.01) |
| *B23Q 17/24* | (2006.01) |
| *B23Q 5/02* | (2006.01) |
| *G05B 19/12* | (2006.01) |

(52) U.S. Cl.
CPC ......... *B23Q 17/2457* (2013.01); *G05B 19/12* (2013.01); *G05B 2219/43125* (2013.01); *G05B 2219/49302* (2013.01); *G05B 2219/49304* (2013.01); *G05B 2219/50275* (2013.01)

(58) Field of Classification Search
None
See application file for complete search history.

(56) References Cited

U.S. PATENT DOCUMENTS

| | | | | |
|---|---|---|---|---|
| 3,173,203 A | * | 3/1965 | Anthony ............ | B23Q 3/15546 29/26 R |
| 3,225,439 A | * | 12/1965 | Perry .................... | B23Q 3/157 483/12 |
| 4,507,834 A | * | 4/1985 | Chen .................... | B23B 49/001 29/26 R |
| 4,784,421 A | * | 11/1988 | Alvite' .................... | B25J 15/04 294/119.1 |
| RE32,837 E | * | 1/1989 | Corni ................. | B23Q 3/15546 235/375 |
| 5,974,643 A | * | 11/1999 | Hays .................. | B23Q 17/2233 29/39 |

(Continued)

FOREIGN PATENT DOCUMENTS

WO    WO 2012114486 A1 *  8/2012 ......... B23Q 17/2233

*Primary Examiner* — Hemant M Desai
*Assistant Examiner* — Tanzim Imam
(74) *Attorney, Agent, or Firm* — Coats & Bennett, PLLC

(57) ABSTRACT

A tooling system that includes a drive unit configured to provide rotational force to a tool member. The tool member is attached at a mount on the drive unit. A camera associated with the drive unit is aligned to capture a target on the tool member. The data is sent to a controller that identifies the tool member based on the target. The controller determines whether the tool member is correct for performing an operation on a work piece. If the tool member is correct, the controller may set one or more operating parameters on the drive unit. If the controller determines that the tool member is not correct, the drive unit is disabled. Further, a signal may be sent to inform an operator of the issue.

19 Claims, 9 Drawing Sheets

(56) References Cited

U.S. PATENT DOCUMENTS

| | | | | |
|---|---|---|---|---|
| 7,431,682 B2* | 10/2008 | Zeiler | ................ | B23B 45/00 |
| | | | | 483/9 |
| 7,900,664 B2* | 3/2011 | Altenhoner | ........ | B23Q 17/2233 |
| | | | | 144/356 |
| 2002/0056749 A1* | 5/2002 | Hetzer | ............... | B23Q 3/15546 |
| | | | | 235/454 |
| 2007/0018604 A1* | 1/2007 | Montesanti | ............. | B23Q 1/36 |
| | | | | 318/687 |
| 2007/0293987 A1* | 12/2007 | Yamada | ................... | B25J 13/06 |
| | | | | 700/245 |
| 2008/0262654 A1* | 10/2008 | Omori | ................... | A61B 90/96 |
| | | | | 700/245 |
| 2009/0090763 A1* | 4/2009 | Zemlok | ........... | A61B 17/07207 |
| | | | | 227/175.2 |
| 2011/0168419 A1* | 7/2011 | Reynolds | ............. | B23B 45/003 |
| | | | | 173/46 |
| 2011/0214890 A1* | 9/2011 | Wallgren | ................ | B25B 23/14 |
| | | | | 173/2 |
| 2011/0301611 A1* | 12/2011 | Garcia | ................ | A61B 17/162 |
| | | | | 606/80 |
| 2013/0032369 A1* | 2/2013 | Dridger | ................... | B25B 21/00 |
| | | | | 173/2 |
| 2013/0273815 A1* | 10/2013 | Schneider | ........... | B24B 13/0037 |
| | | | | 451/8 |
| 2014/0005829 A1* | 1/2014 | Chhatpar | ............... | B25J 9/1692 |
| | | | | 700/254 |

* cited by examiner

TOOLING SYSTEM WITH VISUAL IDENTIFICATION OF ATTACHED COMPONENT

RELATED APPLICATIONS

The present application is a divisional of application Ser. No. 14/074,492 filed Nov. 7, 2013 and which is hereby incorporated by reference in its entirety.

BACKGROUND

The present application is directed to tooling system for performing an operation on a work piece and, more particularly, to a tooling system that determines one or more operating parameters for a tool based on a captured image of an attached component.

Tooling systems are configured to perform operations on a work piece. One example of a tooling system includes one or more tools that are aligned along an assembly line. Each of the tools is configured to perform one or more operations on the work piece as it moves along the assembly line. The tools may include a drive unit and an attachable tool member. The tool member is configured to engage the work piece and be driven by the drive unit to perform the operation. The drive units may be configured to receive multiple different tool members. Examples of different tool members include socket sets with each socket being a different size, and a driver set each with a shape to engage with a different screw head (e.g., flat, TORX, Robertson, hex, pozidrive, polydrive, Bristol). The different tool members may be attached to the drive unit robotically or manually by an operator.

The drive units are adjustable to operate at different settings. For example, the drive unit may provide for moving the tool members at different speeds and different torque settings. These different settings are established based at least in part on the specific tool member and the specific operation being performed on the work piece. Failure of the drive units to operate at the established settings may cause damage to one or more of the drive unit, tool member, and the work piece, or result in a quality problem for the assembled part.

There is a need for the tooling system to ensure that the correct operating parameters are set on the drive unit. This will prevent or greatly reduce the likelihood of the incorrect tool member engaging with the work piece or for the drive unit to operate at one or more incorrect settings.

This check system should also be configured to maintain the efficiency of the tooling system. The tooling system may be configured to perform each operation in a limited amount of time. The check system should be configured to not adversely affect the efficiency of the system. Further, it may be desirable for the check system to be automated such that an operator is not required to perform the check. Automating the check system should improve the speed and also reduce labor costs needed for operation of the tooling system.

SUMMARY

The present application is directed to tooling systems and methods of setting one or more operating parameters on a drive unit. One embodiment is directed to a tooling system for performing an operation on a work piece that includes a drive unit with a mount and a motor that rotates the mount. The drive unit includes different settings to adjust drive parameters of the motor. The system also includes a tool member attached to the drive unit and being configured to engage with the work piece. A target is visible on the tool member. The system also includes a camera incorporated with the drive unit and configured to capture an image of the target when the tool member is attached to the mount. A controller identifies the target based on the image of the target captured by the camera and adjusts one or more of the settings on the drive unit based on the image of the target captured by the camera.

The controller may be further configured to identify the tool member based on the identification of the image of the target captured by the camera.

The drive unit may include an exterior housing and the motor and the controller may be positioned within the exterior housing. The camera may be positioned within the exterior housing with the exterior housing including an opening for a lens of the camera.

The tooling system may also include a cable that extends between the drive unit and the controller to send data regarding the image captured from the camera from the drive unit to the controller.

The tooling system may also be configured for the camera to communicate with the controller through a wireless interface.

The controller may prevent the mount of the drive unit from rotating based on the identification of the image of the target captured by the camera.

Another embodiment is directed to a tooling system for performing an operation on a work piece. The system includes a drive unit; a tool member attached to the drive unit and also configured to engage with the work piece. First and second targets are visibly positioned on the tool member, with the two targets being visibly distinct. A vision system is associated with the drive unit and configured to capture an image of each of the first and second targets when the tool member is attached to the drive unit. A controller is configured to control a first aspect of the drive unit based on the image of the first target captured by the vision system and to control a second aspect of the drive unit based on the image of the second target captured by the vision system.

The first aspect of the drive unit may be to control rotation of a mount of the drive unit that attaches to the tool member.

The second aspect of the drive unit may be a rotational speed of a mount of the drive unit that attaches to the tool member.

The vision system may include a single camera with a viewing zone that extends over a limited section of the tool member, with the drive unit configured to rotate the tool member such that each of the first and second targets move through the viewing zone.

The first and second targets may be positioned at different locations on the tool member that are located different distances from the drive unit. The vision system may include separate first and second cameras each with different focal lengths with the first camera including a first focal length to capture the image of the first target and the second camera including a second focal length to capture the image of the second target.

The vision system may be incorporated with the drive unit and each may be positioned within a common housing of the drive unit.

The system may include a cable that extends between the drive unit and the controller which is remotely located away from the drive unit.

The system may include a protective sleeve that extends around at least a portion of the tool member including the first and second targets. The protective sleeve may include a window positioned towards the vision system.

Another embodiment is directed to a method of performing an operation on a work piece. The method includes capturing an image of a target on a socket that is attached to a drive unit. The method also includes identifying the socket based on the captured image, determining one or more operating parameters based on the captured image, and operating the drive unit with the one or more operating parameters and rotating the socket and performing an operation on the work piece with the socket.

The method may also maintain the socket in a stationary position while capturing the image of the target on the socket.

The method may include sending data to a controller located remotely from the drive unit with the controller determining the one or more operating parameters.

The method may include determining that light at the socket is inadequate prior to capturing the image of the target and illuminating the target at the time the image of the target is captured.

The method may include determining that the socket is incorrect based on the captured image and preventing operation of the drive unit.

The method may include identifying the socket based on the captured image at a controller that is housed in the drive unit.

The various aspects of the various embodiments may be used alone or in any combination, as is desired.

DETAILED DESCRIPTION

The present application is directed to an identification system that visually identifies a tool member that is attached to a drive unit. Based on the identification, the system is configured to determine whether to power the drive unit. The system may be further configured to set specific parameters for the drive unit to perform work on a work piece.

Figure 1:
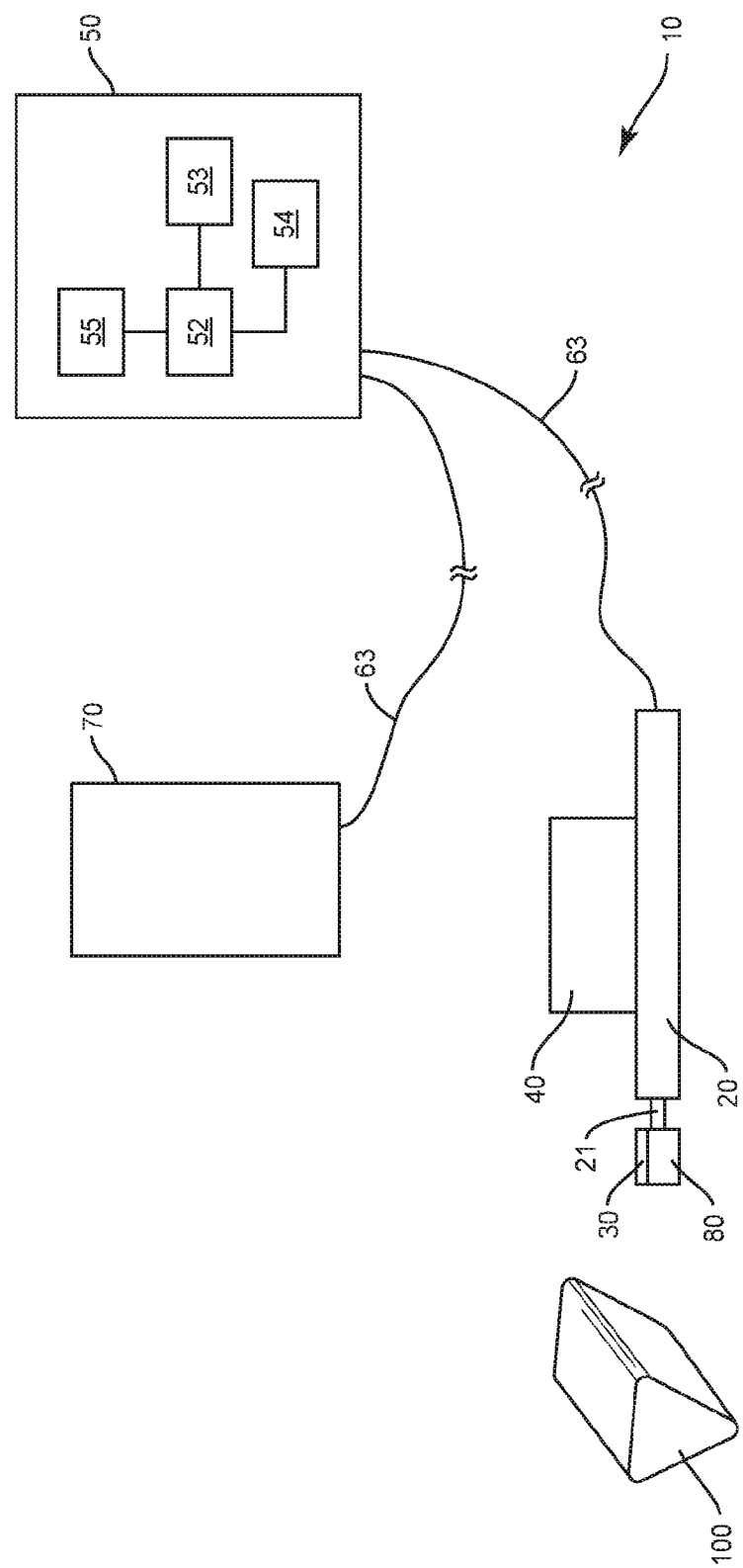
FIG. 1 is a schematic diagram of a tooling system configured to perform an operation on a work piece.

FIG. 1 schematically illustrates a tooling system 10 that includes a drive unit 20 configured to provide a force to a tool member 80. The tool member 80 is attached at a mount 21 on the drive unit 20. A camera 40 associated with the drive unit 20 is aligned to capture a target 30 on the tool member 80. The data from the camera 40 is sent to a controller 50 that identifies the tool member 80 based on the target 30. The controller 50 then determines whether the tool member 80 is correct for performing an operation on the work piece 100. If the tool member 80 is correct, the controller 50 may set one or more operating parameters on the drive unit 20. If incorrect, the controller 50 prevents operation of the drive unit 20.

The controller 50 manages the operation of the drive unit 20 and the vision recognition system. The controller 50 may be a separate component positioned remotely away from the drive unit 20 as illustrated in FIG. 1. The controller 50 may be positioned in a cabinet or the like on or in proximity to the assembly area. The controller 50 may include a control circuit 52 with one or more processors and/or microcontrollers that controls the overall operation of the drive unit 20 according to program instructions stored in memory 53. Various types of memory may be included for storing program instructions and data needed for operation, and other memory for storing temporary data required to carry out its operations. The system controller 20 may also include a user interface 54 that may include one or more user input devices such as a keypad, touchpad, function keys, scroll wheel, or other type of computer input device. A display 55 may also be included, such as a conventional liquid crystal display (LCD) or touch screen display which also functions as a user input device.

In one embodiment, the system 10 also includes a separate tool controller 70 that monitors and controls the operations of the drive unit 20. The tool controller 70 may also manage the operation of the vision recognition system. The tool controller 70 may include additional control circuitry and associated memory to act through program instructions to control the drive unit 20. Tool controller 70 may further include an interface and display for interaction with a user.

FIG. 1 schematically illustrates a single drive unit 20 operatively connected to the controllers 50, 70. One or both controllers 50, 70 may also control additional drive units 20 positioned throughout the assembly area.

The drive unit 20 may be operatively connected to the controller 50 and tool controller 70 in a variety of manners. This may include one or more cables 63 configured to supply data between the various components. The cables 63 may also be configured to provide power to one or more of the components from a power supply. The communications between the components may also include a wireless interface, such as through a Bluetooth interface or wireless local area network (WLAN) interface. Various other modes of communication between the components may include sonic communications using a sonic carrier signal, and communications using a light signal. Some embodiments feature a combination of different communication modes (e.g., cabling and wireless communications).

The drive unit 20 provides a force to the tool member 80 to perform an operation on the work piece 100. In one embodiment, the drive unit 20 is configured to provide a rotational force to the attached tool member 80. Drive unit 20 may also provide different forces depending upon the tool member 80 and specific operation for the work piece 100. In one embodiment, the drive unit 20 provides a reciprocating motion to the tool member 80. The drive unit 20 may include a variety of different devices, such as but not limited to screw spindles (or more generically tightening spindles) to tighten screws and nuts, welders, drills, and others. The drive unit 20 may further include a variety of different sizes, from a hand-held unit configured to be manually operated by a user, to a large stationary industrial unit.

The drive unit 20 includes a motor 23 that provides the force to a mount 21 for moving the attached tool member 80. In one embodiment, the motor 23 is electrically powered either through an exterior power source or internal battery.

The drive unit 20 may also be pneumatically powered. The drive unit 20 is configured to provide varying degrees of movement to the tool member 80, such as torque, rotational speed, and reciprocating speed.

Figure 2:
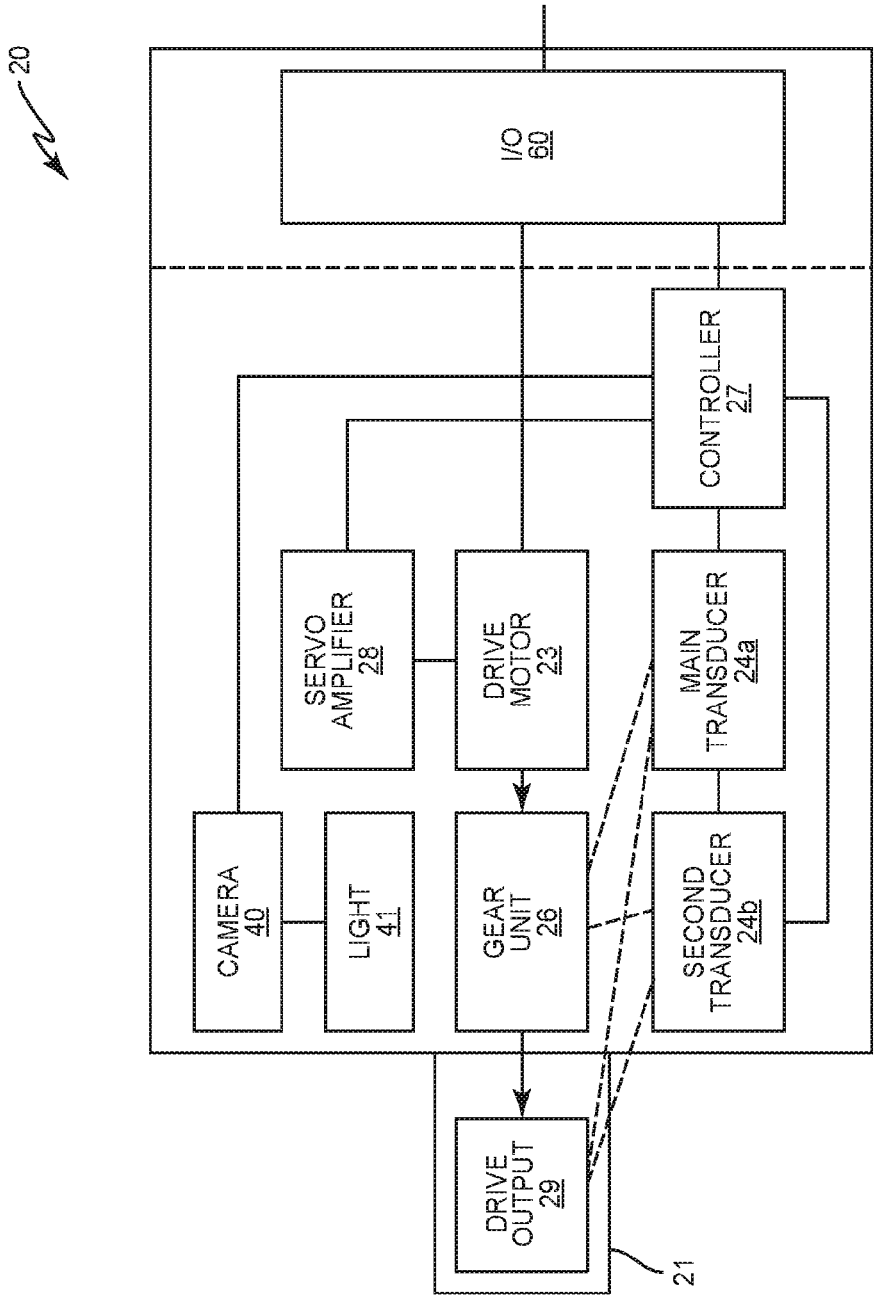
FIG. 2 is a schematic diagram of a drive unit.

In one embodiment, the drive motor 20 is an electrically powered tightening spindle. The spindle 20 may include a variety of different elements and configurations. One embodiment of a spindle 20 is illustrated in FIG. 2 that includes an exterior housing 25 that extends around and protects the internal components. The housing 25 houses the drive motor 23, a gear unit 26, a drive output 29, a measurement transducer 24a, and a controller 27. The drive motor 23 typically has a servo amplifier 28 associated therewith to aid in controlling the drive motor 23. The gear unit 26 helps couple the rotational force from the drive motor 23 to the drive output 29 in a fashion well known in the art.

The measurement transducer 24a is operative to monitor the drive motor 23, the gear unit 26, and/or the drive output 29. The measurement transducer 24a may be analog or digital, and may be removably connected to appropriate electronics, such as the controller 27, using one or more electrical connectors. The measurement transducer 24a may be configured to measure one or more parameters such as rotated angle, applied torque, or first derivatives of either of these parameters with respect to time. The spindle 20 may optionally include a second transducer 24b to provide redundancy, if desired.

The controller 27 receives measurement data from the measurement transducer 24a (or transducers 24a, 24b) and processes the data and then supplies some or all of the processed data to an interface 60. The controller 27 may advantageously be modular or otherwise removably mated to the balance of the drive motor 20 via one or more suitable electrical connectors. The interface 60 may include one or more ports for the supply of power and the transfer of data.

Embodiments of a drive motor 20 are disclosed in U.S. Pat. No. 7,090,031 which is herein incorporated by reference in its entirety. Other embodiments of drive motors include the CLECO LIVEWIRE tools available from Apex Tool Group.

The drive unit 20 further includes a camera 40 to capture the target 30 on the tool member 80 when the tool member 80 is attached to the mount 21. The camera 40 includes an adjustable lens to focus on the target 30. A light 41 may also be associated with the camera 40 in the event additional lighting is necessary to illuminate and capture the target 30. Examples of lights 41 include but are not limited to a light emitting diode, halogen lamp, and electroluminescent lamp. The camera 40 is operatively connected to the controller 27. The image recognition process may occur at one or more of the controllers 27, 50, 70 as will be explained in more detail below.

Figure 3:
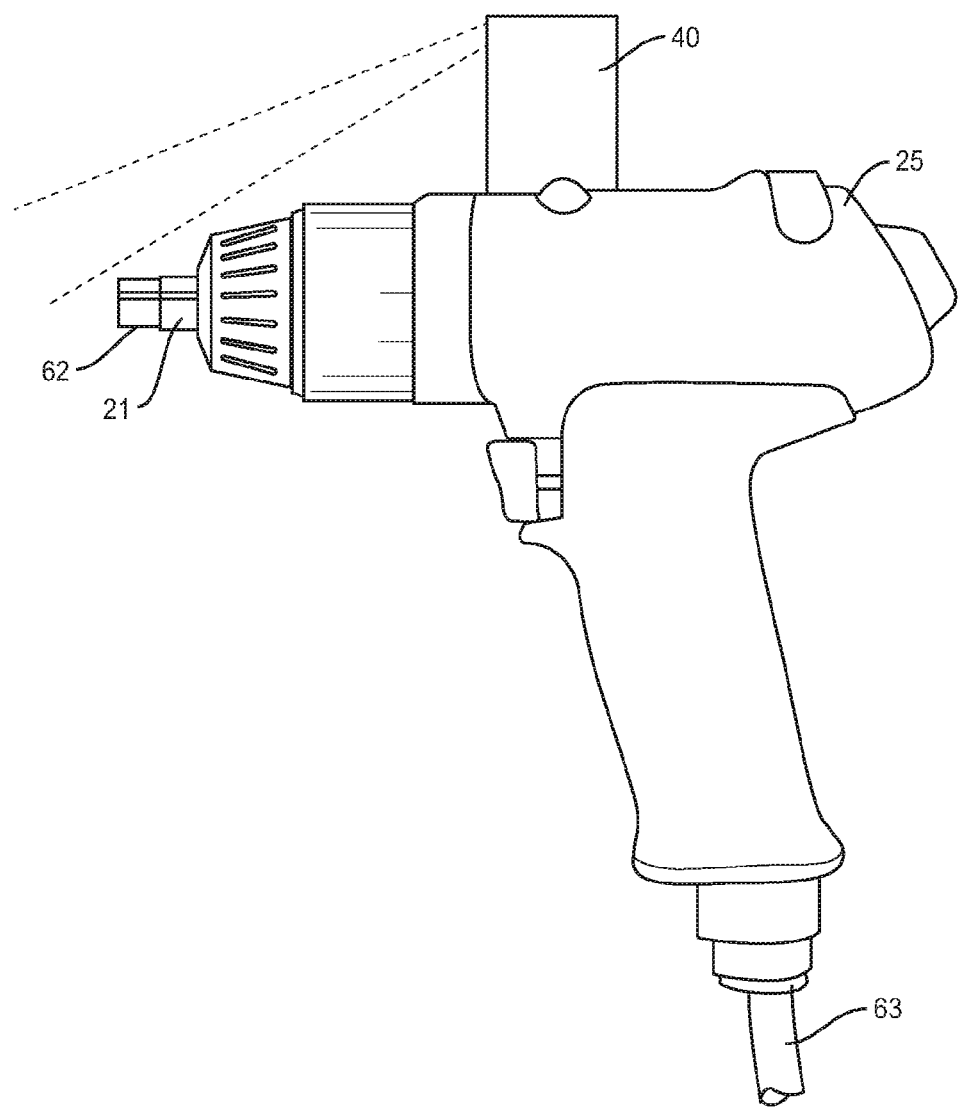
FIG. 3 is a side view of a drive unit.
Figure 4:
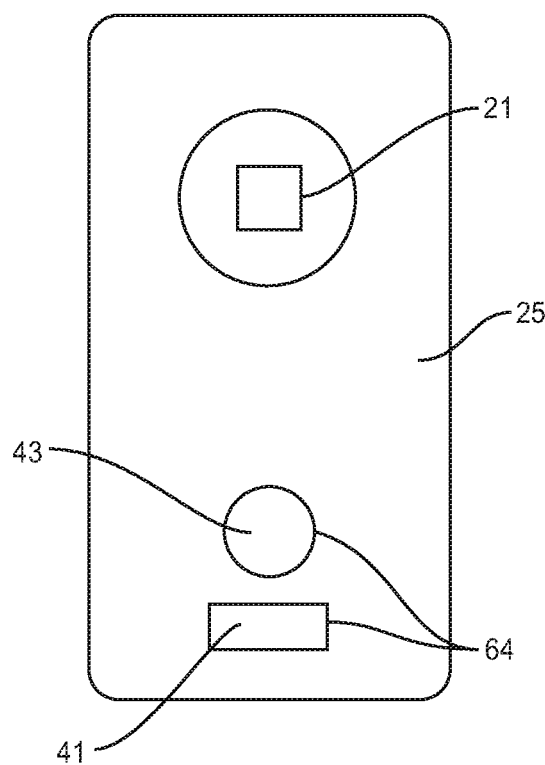
FIG. 4 is a front view of a drive unit having openings for a camera and a light.

FIG. 3 illustrates a drive unit 20 with a camera 40. The camera 40 extends from the housing 25 and is positioned to provide visual access to the front of the drive unit 20 at the mount 21. This position provides for capturing the target 30 when the tool member 80 is attached to the mount 21. FIG. 4 illustrates a front view of a drive unit 20 that includes the mount 21. The camera 40 is positioned within the interior of the housing 25. The housing 25 includes one or more openings 64 to accommodate the camera 40. In the embodiment of FIG. 4, a first opening 64 provides for a lens 43 of the camera 40 and a second opening 64 provides for a light 41.

The mount 21 provides for attachment of the tool member 80 to the drive unit 20. The mount 21 may include an extension from the drive output 29 that extends outward from the front end of the housing 25. The mount 21 may include a specific shape to engage with the tool member 80, such as a rectangular shape with four flat sides. The mount 21 may further include an attachment feature 62 configured to removably attach the tool member 80, such as a ball-and-detent mechanism. The attachment feature 62 may further include a more permanent attachment mechanism that requires tooling for removal of the tool member. Examples include but are not limited to a mechanical fastener that attaches the tool member to the mount 21.

Figure 5:
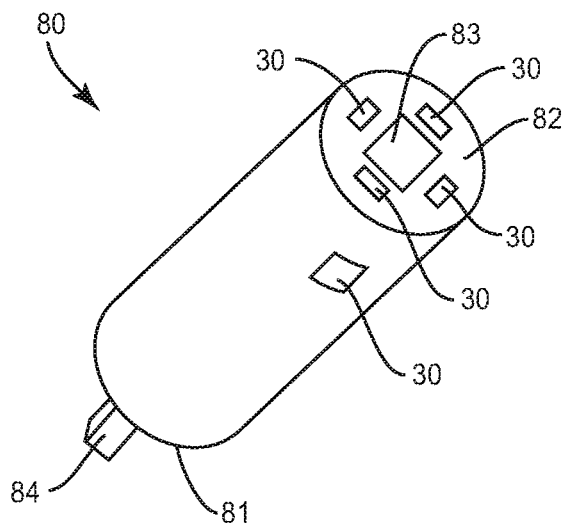
FIG. 5 is a perspective view of a tool member with targets.

The tool member 80 is configured for attaching to the mount 21 and for engaging with work piece 100. FIG. 5 illustrates a tool member 80 that includes a generally cylindrical shape with opposing first and second ends 81, 82. The first end 81 includes a tool engagement member 84 configured to engage with the work piece 100. The engagement member 84 is design to perform an operation on the work piece 100 when placed into contact with the work piece 100 and rotated. FIG. 5 includes the engagement member 84 extending outward from the first end 81, such as various screw head designs. The engagement member 84 may also include a receptacle at the first end 81 that receives the work piece 100. Examples include various sockets of different sizes and configurations that receive a nut or bolt head of the work piece 100. The second end 82 is configured to engage with the mount 21 on the drive unit 20. FIG. 5 includes an embodiment of a receptacle 83 sized to receive the mount 21.

One or more targets 30 are positioned on the tool member 80. FIG. 5 illustrates multiple targets 30, although other embodiments may include more or fewer targets 30. One specific embodiment includes a single target 30. The one or more targets 30 identify the tool member 80 and provide for operating the drive unit 20 in the proper manner to perform the operation on the work piece 100. The target 30 may include a variety of different formats, including but not limited to one or more alphanumeric characters, symbols, barcodes, grayscales, colors, and patterns. The target 30 may be integrally formed with the tool member 80, may be etched into the tool member 80, or may be attached to the tool member 80 (such as a label, paint, etc.).

In one embodiment with multiple targets 30, each of the targets 30 is the same. The system 10 is configured to obtain the same type of usage information from each of the targets 30. In other embodiments, two or more of the targets 30 are different and provide different information to the system 10. In one embodiment, a first one of the targets 30 identifies the tool member 80 and a second one of the targets 30 identifies one or more parameters for operating the drive unit 20 during usage of the tool member 80.

In one embodiment, a first target 30 is positioned at a first location along the tool member 80. This first target 30 conveys a first type of information. A different second target 30 is positioned at a different second location along the tool member 80 and conveys a different second type of information. In one embodiment, one of the targets 30 may be positioned at the first end 82 of the tool member 80, and the second target may be positioned along the between the ends 81, 82.

Figure 6:
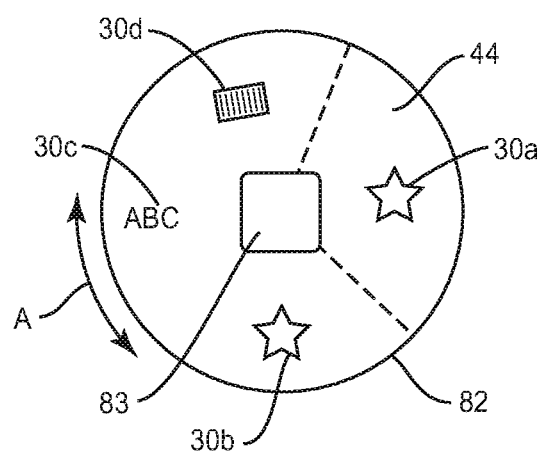
FIG. 6 is an end view of a tool member with targets.

The targets 30 may be aligned to accommodate the various rotational positions of the tool member 80. As illustrated in FIG. 6, the camera 40 may be configured to have a limited viewing zone 44. The viewing zone 44 extends over a limited portion of the tool member 80. The targets 30 may be aligned about the tool member 80 such that at least one is positioned in the viewing zone at the various rotational positions. In the embodiment of FIG. 6, the first target 30a is positioned in the viewing zone 44, with the other targets 30b, 30c, 30d positioned outside of the viewing zone 44 and being undetectable by the camera 40. In this embodiment, the viewing zone 44 extends along about a 90 degree window of the second end 82 of the tool member 80. The targets 30 are spread apart by about 90 degrees such that at least one target 30 is positioned in the viewing zone 44 at the various rotational positions. In one embodiment as illustrated in FIG. 6, the targets are position around the central receptacle 83.

In another embodiment, there may be an occurrence in which no targets 30 are positioned in the viewing zone 44. In this instance, the controller may toggle the drive unit 20 to move the tool member 80 a small amount such that a target 30 is moved into the viewing zone.

The camera 40 may be configured to detect the targets 30 at various times of operation. In one embodiment, the camera 40 is able to detect the targets 30 when the tool member 80 is stationary. The camera 40 may further be able to detect the targets 30 during rotation of the tool member 80. In one embodiment, the camera 40 includes a faster shutter speed than the movement of the tool member 80 to capture the target during movement of the member 80.

The camera 40 is configured to capture an image of the one or more targets 30. This processor 27 of the drive unit 20 receives the data which is then sent to the controller 50. The controller 50 is configured to identify the target 30. In one embodiment, the control circuit 52 is configured to perform image recognition based on previously-stored data saved in the memory 53. Once identified, the controller 50 is further configured to determine the operational parameters for the drive unit 20. This information may also be stored in memory 53. The various information stored in memory 53 may be configured in various manners. One embodiment includes the information being stored in look-up tables stored in memory 53.

In another embodiment, the data from the drive unit 20 is sent to the tool controller 70. Controller 70 is configured to identify the target 30 in a manner similar to that described above for controller 50.

Figure 7:
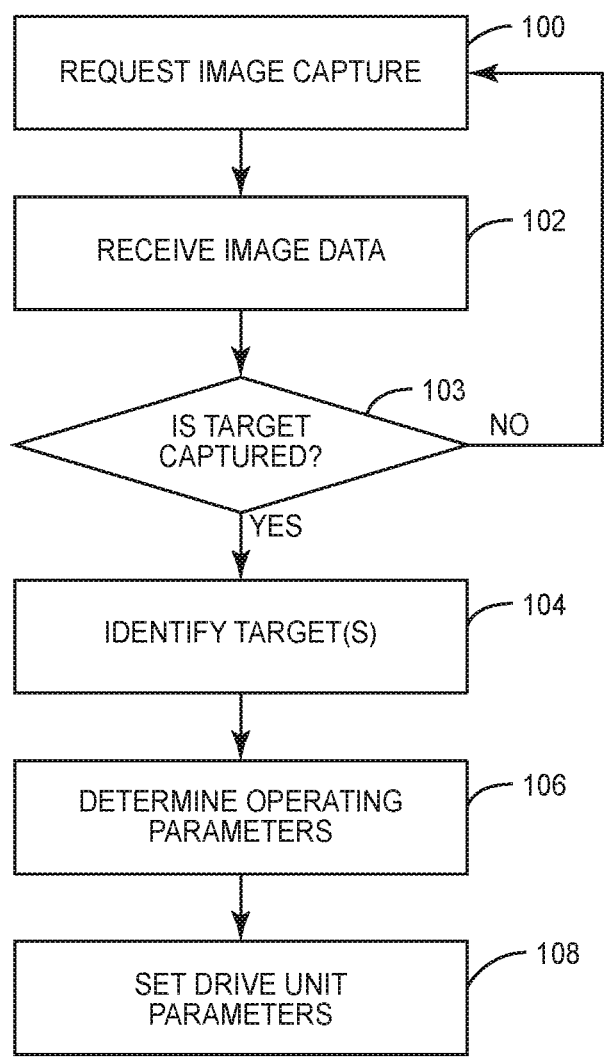
FIG. 7 is a flowchart of a method of setting tooling parameters for a drive unit.

FIG. 7 illustrates one methodology of operating the tooling system 10 to perform an operation on the work piece 100. Initially, the controller 50 requests an image capture from the camera 40 (step 100). This may occur initially when a new tool member 80 has been attached and while the drive unit 20 is non-operational (i.e., stopped). In another embodiment, controller 27 of the drive unit 20 may automatically send camera data each time the tool member 80 is changed.

In response, the camera 40 captures one or more images of the section of the tool member 80 in the viewing zone 44. The captured data is then forwarded and received by the controller 50 (step 102).

The controller 50 determines if the target 30 is captured (step 103). In the event no target is captured such as if no target is positioned within the viewing zone 44, the controller 50 may cause the drive unit 20 to toggle the drive motor 23 and rotate the mount 21 to another rotational position to move the target 30 into the zone 44. The target 30 may also not be captured when the image is unable to be analyzed, such as if the focus or the lighting is poor. The controller 50 may request and receive one or more additional captured images. In the event an adequate image cannot be captured, the controller 50 may prevent operation of the drive unit 20 and send a message to the display 55 notifying the operator of the issue.

When the image is adequately captured, the controller 50 identifies the target (step 104). In one embodiment, image recognition software is stored in memory 54 and accessed to identify the captured image. The process may include a comparison of the captured image with a plurality of targets previously stored in memory 54.

Once the target 30 is identified, the controller 50 determines the operating parameters for the drive unit 20 based on the captured image (step 106). This may initially include determining that the correct tool member 80 is attached to the drive unit 20. If the controller 50 determines that the tool member 80 is incorrect, the controller 50 will prevent operation of the drive unit 20. Further, the controller 50 may send a signal to the display 55 indicating the attachment of the incorrect tool member 80.

If the tool member 80 is correct, the controller 50 determines and sets one or more operating parameters for the drive motor 20 (step 108). The controller 50 may provide signals to the controller 27 in the drive unit 20 to operate under the determined parameters. These may include various operational aspects, such as but not limited to rotational speed, torque, and reciprocating speed.

Figure 8:
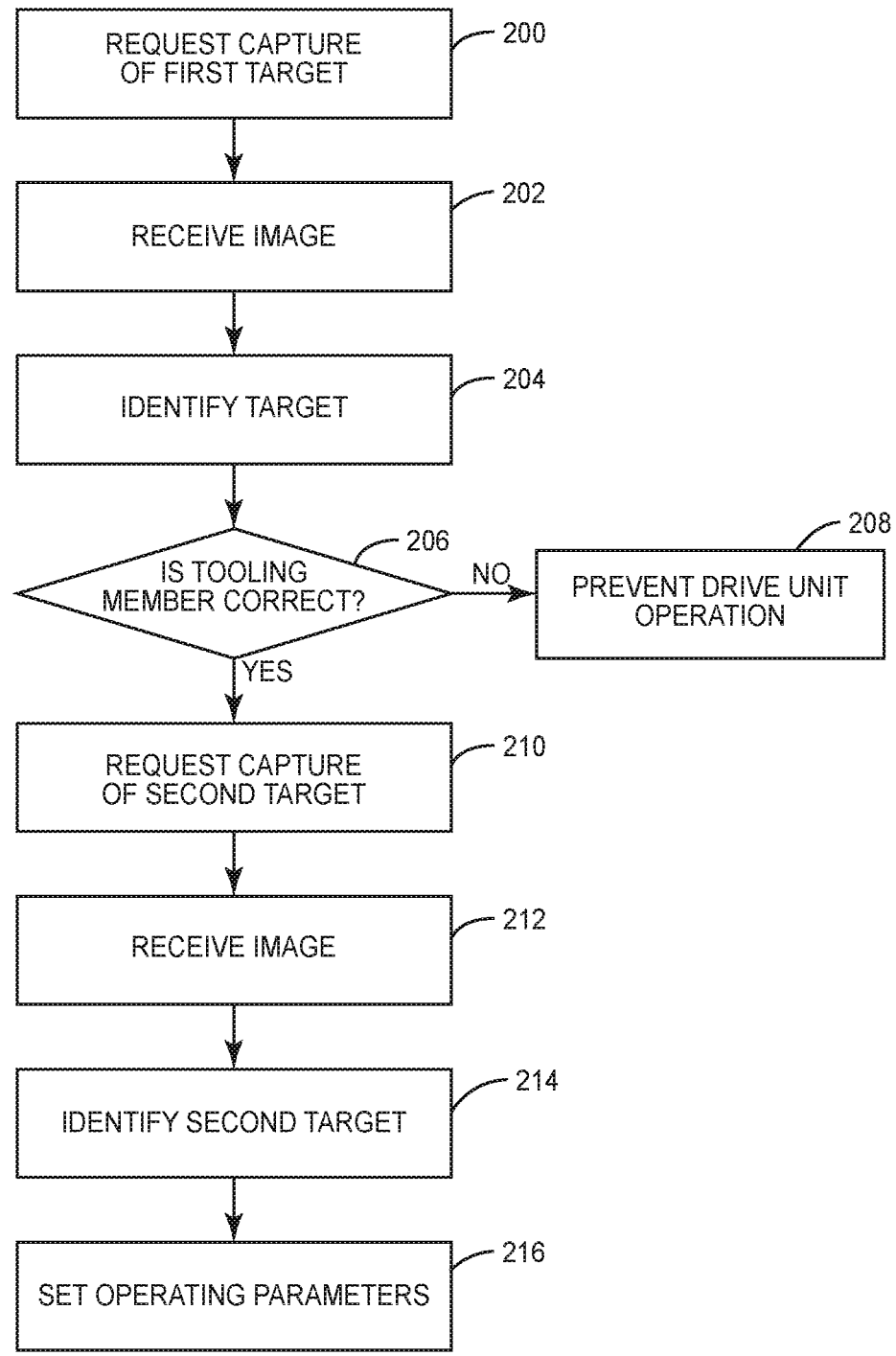
FIG. 8 is a flowchart of a method of setting tooling parameters for a drive unit.

In some embodiments with multiple targets 30, an image of each target is initially captured. The system 10 may also be configured to capture each of the targets 30 separately. One embodiment is illustrated in FIG. 8.

The controller 50 requests the capture of an image of a first target 30 (step 200). In response, the camera 40 captures one or more images of the first target (step 202). Alternatively, the camera data is automatically sent from the drive unit 20 due to a change in the tool member 80. The controller 50 receives the images and identifies the first target (step 204). The controller 50 further determines whether the tool member 80 is proper for the current operation on the work piece 100 (step 206). If the tool member 80 is not correct, operation of the drive unit 20 is prevented (step 208).

If the tool member 80 is correct, the controller 50 requests capture of an image of the second target 30 (step 210). The controller 50 receives the image of the second target 212 and identifies the second target (step 214). Based on the identification, the controller 50 determines one or more operating parameters which are then set for the drive unit 20 (step 216).

Figure 11:
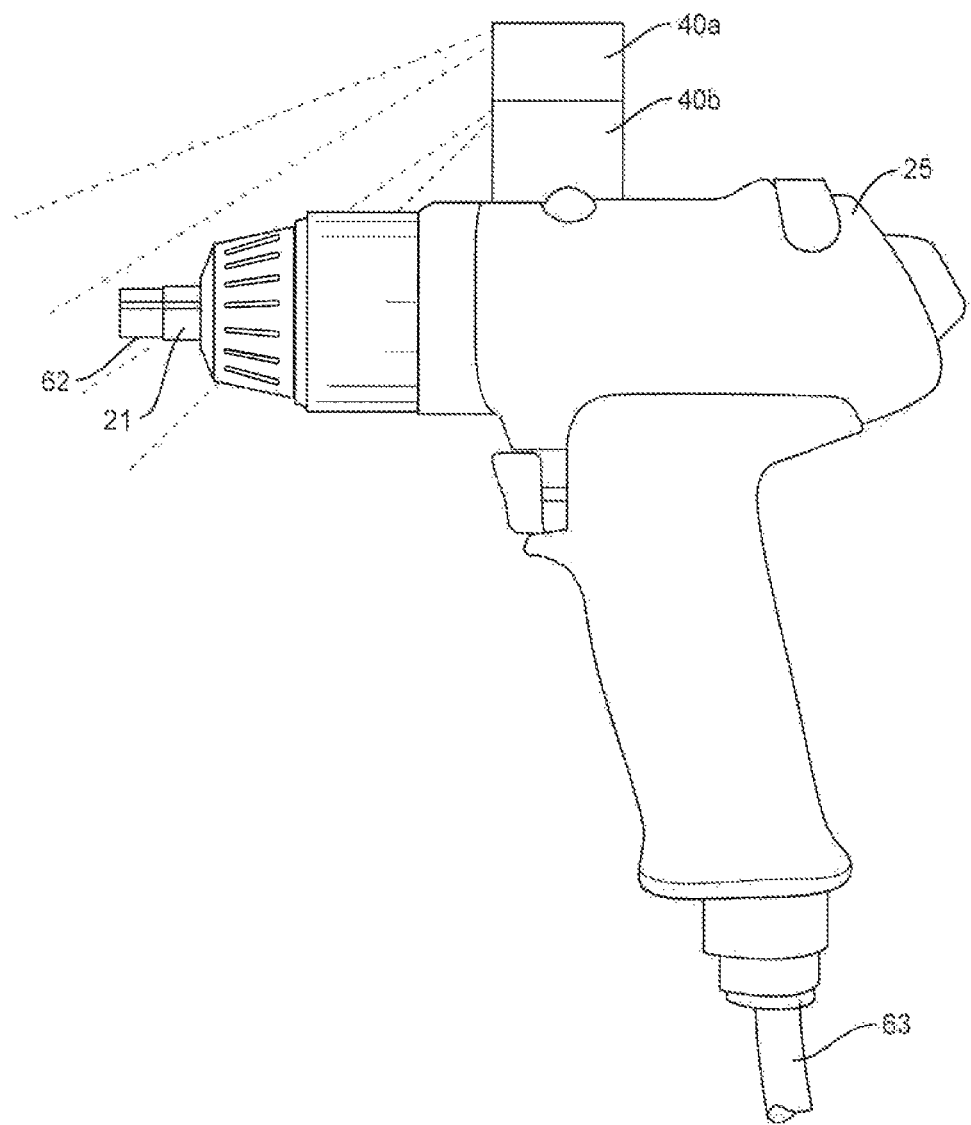
FIG. 11 is a side view of a drive unit.

In the various embodiments, a single camera 40 may be used to capture the one or more targets 30. Alternatively, multiple cameras 40 may be used to capture the different targets 30 as illustrated in FIG. 11. In one embodiment, a first camera 40a captures a target on a first portion of the tool member 80, and a different second camera 40b captures a target on a second portion of the tool member 80. The different cameras 40a, 40b may also include different focal lengths to prevent inadvertent capture of the wrong target.

In the embodiments of a tooling system 10 that includes multiple controllers such as system controller 50 and tool controller 70, the identification of the one or more targets 30 may be performed by one or more of the controllers 50, 70.

In another embodiment, the controller 27 in the drive unit 20 performs at least part of the target identification. The controller 27 includes a control circuit with one or more processors and/or microcontrollers that performs image identification according to program instructions stored in memory in the controller 27. In one embodiment, the controller 27 performs the identification of the targets, determines the operating parameters, and sets the parameters for operation of the drive unit 20 (i.e., these operations are not performed by an external controller). In another embodiment, the controller 27 performs the identification of the target 30 to ensure the correct tool member 80. The operating parameters are determined upstream at one or more of the controllers 50, 70.

Figure 9:
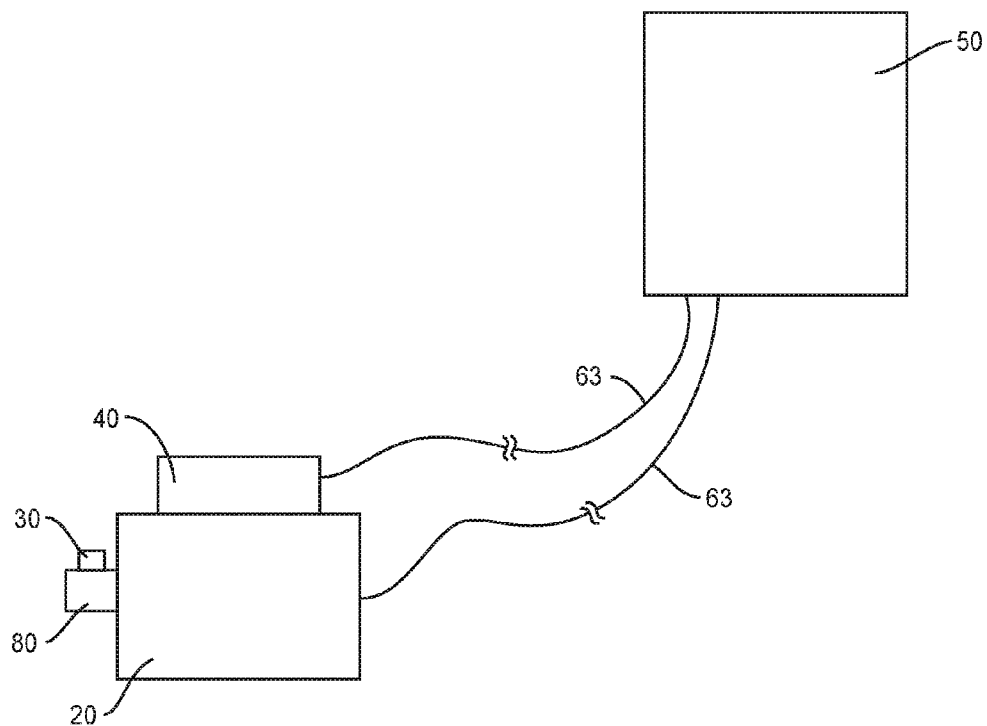
FIG. 9 is a schematic diagram of a separate drive unit and camera each operatively connected to a controller.

The camera 40 may be incorporated into the drive unit 20 as illustrated in FIG. 2. The camera 40 may also be a separate unit that is attached to the drive unit 20. FIG. 9 illustrates an embodiment with the camera 40 being a separate component that is attached to the drive unit 20. The camera 40 is configured to capture images of the one or more targets 30 and to send the data to the controller 50. The drive unit 20 functions independently of the camera 40 and sends its data separately to the controller 50.

The tooling system 10 may also include a shield 90 that extends around a portion or entirety of the tool member 80 when attached to the drive unit 20. The shield 90 prevents an operator or other person from inadvertently contacting against the moving the tool member 80. The shield 90 may be attached to the housing 25 of the drive unit 20 or otherwise mounted to remain stationary during movement of the tool member 80. To prevent blocking the camera 40, the shield 90 includes one or more transparent sections that provide from the camera 40 to capture an image of the one or more targets 30.

Figure 10:
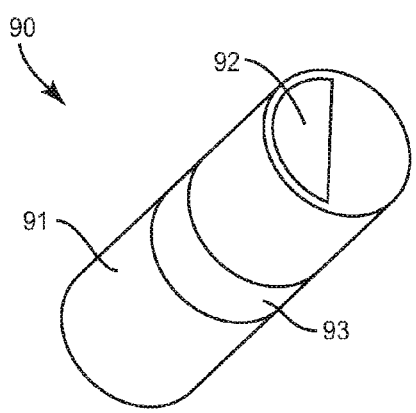
FIG. 10 is a perspective view of a protective sleeve sized to extend around a tool member.

FIG. 10 illustrates an embodiment of the shield 90 that is shaped and sized to extend over the tool member 80. The shield 90 is constructed of an opaque material that is design to prevent contact with the tool member 80. In this embodiment, first and second viewing sections 92, 93 are positioned to provide capturing of the targets 30 on the tool member 80. The number, size, and shape of the viewing sections 92, 93 may vary depending upon the tool member 80, targets 30, and camera 40.

The operational control of one or both of the drive unit 20 and the image recognition system may be performed by one or more controllers located at various physical locations within the system 10. The control may be integrated with the drive unit 20 through an on-board controller 27. Operational control of one or more of the functions may also be performed by one or both controllers 50, 70. In one embodiment, one or both controllers 50, 70 are located within the vicinity of the work area. In another embodiment, one or both controllers 50, 70 are located remotely away from the work area. In one embodiment, the remote location may provide for a "virtual controller" that provides for all of the processing and control operations required for the system 10.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tooling system for performing an operation on a work piece, the tooling system comprising:
   a drive unit;
   a tool member removably attached to the drive unit and configured to engage with the work piece;
   first and second targets that are visibly positioned on the tool member, the first and second targets being visibly distinct;
   a vision system associated with the drive unit and configured to capture an image of each of the first and second targets when the tool member is attached to the drive unit; and
   a controller configured to control a first aspect of the drive unit based on the image of the first target captured by the vision system and to control a second aspect of the drive unit based on the image of the second target captured by the vision system;
   the drive unit configured to rotate the tool member such that each of the first and second targets are visible to the vision system.

2. The tooling system of claim 1, wherein the first aspect of the drive unit controls rotation of a mount of the drive unit that attaches to the tool member.

3. The tooling system of claim 1, wherein the second aspect of the drive unit is a rotational speed of a mount of the drive unit that attaches to the tool member.

4. The tooling system of claim 1, wherein the vision system includes a single camera with a viewing zone that extends over a limited section of the tool member, with the drive unit configured to rotate the tool member such that each of the first and second targets move through the viewing zone.

5. The tooling system of claim 1, wherein tine first and second targets are positioned at different locations on the tool member that are located at different distances from the drive unit, the vision system including separate first and second cameras each with different focal lengths with the first camera including a first focal length to capture the image of the first target and the second camera including a second focal length to capture the image of the second target.

6. The tooling system of claim 1, wherein the vision system and the drive unit are positioned within a single housing.

7. The tooling system of claim 1, wherein the controller identifies the first and second targets based on the images of the first and second targets captured by the vision system when the tool member is stationary.

8. The tooling system of claim 1, wherein the first and second targets are separate elements that are attached to the tool member.

9. The tooling system of claim 1, wherein the drive unit is configured to be stationary prior to the controller identifying the first and second targets.

10. The tooling system of claim 1, wherein the controller is configured to rotate the tool member after the images of the first and second targets are captured by the vision system and the first and second targets are identified.

11. The tooling system of claim 1, wherein the drive unit comprises a motor.

12. A tooling system for performing an operation on a work piece, the tooling system comprising:
    a motor;

a tool member removably attached to the motor and configured to engage with the work piece;

targets that are visibly positioned on the tool member with each of the targets being visibly distinct;

a camera configured to capture an image of each of the targets when the tool member is attached to the motor; and a control circuit that controls the motor based on the images of the targets captured by the camera;

wherein the camera includes a viewing zone that extends over a limited section of the tool member, with the motor configured to rotate the tool member such that each of the targets move through the viewing zone.

13. The tooling system of claim 12, wherein the camera and the motor are positioned within a common housing.

14. The tooling system of claim 12, wherein each of the targets are separate elements that are attached to the tool member.

15. The tooling system of claim 12, wherein the control circuit is configured to rotate the tool member after the image of a first one of the targets is captured by the camera and the first one of the targets is identified.

16. A tooling system for performing an operation on a work piece, the tooling system comprising:

a motor;

a tool member;

targets that are visibly positioned on the tool member;

a vision system configured to capture images of the targets; and a control circuit configured to:
  receive a first image from the vision system of a first one of the targets when the tool member is rotated by the motor to a first rotational position;
identify the first target;
  determine whether the tool member is proper for the operation on the work piece;
  receive a second image from the vision system of second one of the targets when the toot member is rotated by the motor to a second rotational position;
  identify the second target; and
  determine one or more operating parameters for the motor based on the identified second target.

17. The tooling system of claim 16, wherein the control circuit is further configured to prevent operation of the motor after determining based on the identified first target that the tool member is not proper for the operation on the work piece.

18. The tooling system of claim 16, wherein the vision system comprises a single camera that captures the images of the targets.

19. The tooling system of claim 16, wherein the vision system comprises a first camera that captures the first image and a second camera that captures the second image.

* * * * *